United States Patent
Agarwal et al.

(10) Patent No.: US 11,698,751 B2
(45) Date of Patent: Jul. 11, 2023

(54) DATA STORAGE DEVICE AND METHOD FOR LOW-LATENCY POWER STATE TRANSITIONS BY HAVING POWER ISLANDING IN A HOST MEMORY BUFFER

(71) Applicant: Western Digital Technologies, Inc., San Jose, CA (US)

(72) Inventors: Dinesh Kumar Agarwal, Karnataka (IN); Amit Sharma, Karnataka (IN)

(73) Assignee: Western Digital Technologies, Inc., San Jose, CA (US)

(*) Notice: Subject to any disclaimer, the term of this patent is extended or adjusted under 35 U.S.C. 154(b) by 23 days.

(21) Appl. No.: 17/340,399

(22) Filed: Jun. 7, 2021

(65) Prior Publication Data
US 2022/0391132 A1 Dec. 8, 2022

(51) Int. Cl.
*G06F 3/06* (2006.01)
(52) U.S. Cl.
CPC .......... *G06F 3/0656* (2013.01); *G06F 3/0625* (2013.01); *G06F 3/0679* (2013.01)
(58) Field of Classification Search
CPC .... G06F 3/0679; G06F 3/0625; G06F 1/3275; G06F 3/0634; G06F 3/0656; Y02D 10/00
USPC ......................................... 711/154, 104, 103
See application file for complete search history.

(56) References Cited

U.S. PATENT DOCUMENTS

| | | | |
|---|---|---|---|
| 10,642,496 B2 | 5/2020 | Benisty et al. | |
| 2008/0195875 A1* | 8/2008 | Hobson | G06F 12/1408 713/320 |
| 2014/0208156 A1* | 7/2014 | Muralimanohar | G06F 3/0625 714/6.24 |
| 2016/0026406 A1 | 1/2016 | Hahn et al. | |
| 2016/0274797 A1 | 9/2016 | Hahn | |
| 2017/0242606 A1 | 8/2017 | Maiko et al. | |
| 2017/0336978 A1* | 11/2017 | Fanning | G06F 3/0688 |
| 2018/0039578 A1 | 2/2018 | Yun et al. | |
| 2019/0034114 A1* | 1/2019 | Natarajan | G11C 16/3495 |

(Continued)

FOREIGN PATENT DOCUMENTS

| | | | |
|---|---|---|---|
| WO | WO 2013/048960 A1 | 4/2013 | |
| WO | WO 2019/118096 A1 | 6/2019 | |
| WO | WO 2019118096 A1 * | 6/2019 | ......... G06F 12/0868 |

OTHER PUBLICATIONS

International Search Report dated Apr. 7, 2022 for International Application No. PCT/US2022/011805.

(Continued)

*Primary Examiner* — Hashem Farrokh
(74) *Attorney, Agent, or Firm* — Crowell & Moring LLP (57) ABSTRACT

A data storage device and method for low-latency power state transitions by having power islanding in a host memory buffer are provided. In one embodiment, a data storage device is provided comprising a volatile memory, a non-volatile memory, and a controller. The controller is configured to receive information from a host about which area, if any, in a host memory buffer will be powered on during a low-power state; and in response to the information indicating that a first area of the host memory buffer will be powered on during the low-power state, flush data from a second area of the host memory buffer that will not be powered on during the low-power state to the first area of the host memory buffer prior to entering the low-power state. Other embodiments are provided.

20 Claims, 9 Drawing Sheets

(56) References Cited

U.S. PATENT DOCUMENTS

2021/0349134 A1* 11/2021 Ranganathan ........ G06F 1/3243
2021/0405892 A1* 12/2021 Bonen ............... G11C 11/40615
2022/0075536 A1*  3/2022 Swami .................... G06F 3/068

OTHER PUBLICATIONS

Written Opinion dated Apr. 7, 2022 for International Application No. PCT/US2022/011805.
Search Strategy completed Mar. 15, 2022 for International Application No. PCT/US2022/011805.

* cited by examiner

DATA STORAGE DEVICE AND METHOD FOR LOW-LATENCY POWER STATE TRANSITIONS BY HAVING POWER ISLANDING IN A HOST MEMORY BUFFER

BACKGROUND

A data storage device can be used to store data from a host. In some environments, memory in the host (a "host memory buffer") can be used by the data storage device to store data that otherwise may be stored in a volatile memory in the data storage device.

DETAILED DESCRIPTION

Overview

By way of introduction, the below embodiments relate to a data storage device and method for low-latency power state transitions by having power islanding in a host memory buffer. In one embodiment, a data storage device is provided comprising a volatile memory, a non-volatile memory, and a controller. The controller is configured to receive information from a host about which area, if any, in a host memory buffer will be powered on during a low-power state; and in response to the information indicating that a first area of the host memory buffer will be powered on during the low-power state, flush data from a second area of the host memory buffer that will not be powered on during the low-power state to the first area of the host memory buffer prior to entering the low-power state.

In some embodiments, the controller is further configured to copy the data from the first area of the host memory buffer back to the second area of the host memory buffer after exiting the low-power state.

In some embodiments, the controller is further configured to: in response to the information indicating that no area of the host memory buffer will be powered on during the low-power state, flush data from the second area of the host memory buffer to the volatile memory.

In some embodiments, the controller is further configured to copy the data from the volatile memory back to the second area of the host memory buffer after exiting the low-power state.

In some embodiments, the controller is further configured to maintain, in the volatile memory, a copy of some updates stored in the host memory buffer; and only updates that do not have a copy maintained in the volatile memory are flushed to the first area of the host memory buffer.

In some embodiments, the controller is further configured to use a threshold to determine which updates to maintain a copy of in the volatile memory.

In some embodiments, the controller is further configured to flush the data from the second area of the host memory buffer to the first area of the host memory buffer only if the data is marked as changed.

In some embodiments, the volatile memory is in the controller.

In some embodiments, the information is received from the host via a vendor-specific command.

In some embodiments, the data storage device is a low-power double-data rate (LPDDR) data storage device.

In some embodiments, the non-volatile memory comprises a three-dimensional memory.

In another embodiment, a method is provided that is performed in a host in communication with a data storage device, wherein the host comprises a volatile memory. The method comprises informing the data storage device that a first location in the volatile memory will be powered on during a low-power state; and receiving a command from the data storage device to, prior to entering the low-power state, flush data from a second location in the volatile memory that will not be powered on during the low-power state to the first location in the volatile memory.

In some embodiments, the method further comprises receiving a command from the data storage device to copy the data from the first location in the volatile memory back to the second location of the volatile memory after exiting the low-power state.

In some embodiments, the method further comprises receiving a command from the data storage device to flush data from the second location in the volatile memory to a volatile memory in the data storage device.

In some embodiments, the data storage device is configured to maintain a copy of some updates stored in the volatile memory; and only updates that do not have a copy maintained in the data storage device are flushed to the first location in the volatile memory.

In some embodiments, the data storage device is further configured to use a threshold to determine which updates to maintain a copy of.

In some embodiments, the informing is done using a vendor-specific command.

In some embodiments, the data storage device is a low-power double-data rate (LPDDR) data storage device.

In some embodiments, the method further comprises informing the data storage device that the host is entering a deep power state.

In another embodiment, a data storage device is provided comprising: a volatile memory; a non-volatile memory; means for receiving information from a host about which area, if any, in a host memory buffer will be powered on during a low-power state; and means for flushing data from a second area of the host memory buffer that will not be powered on during the low-power state to the first area of the host memory buffer prior to entering the low-power state in response to the information indicating that a first area of the host memory buffer will be powered on during the low-power state.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figures 1A, 1B:
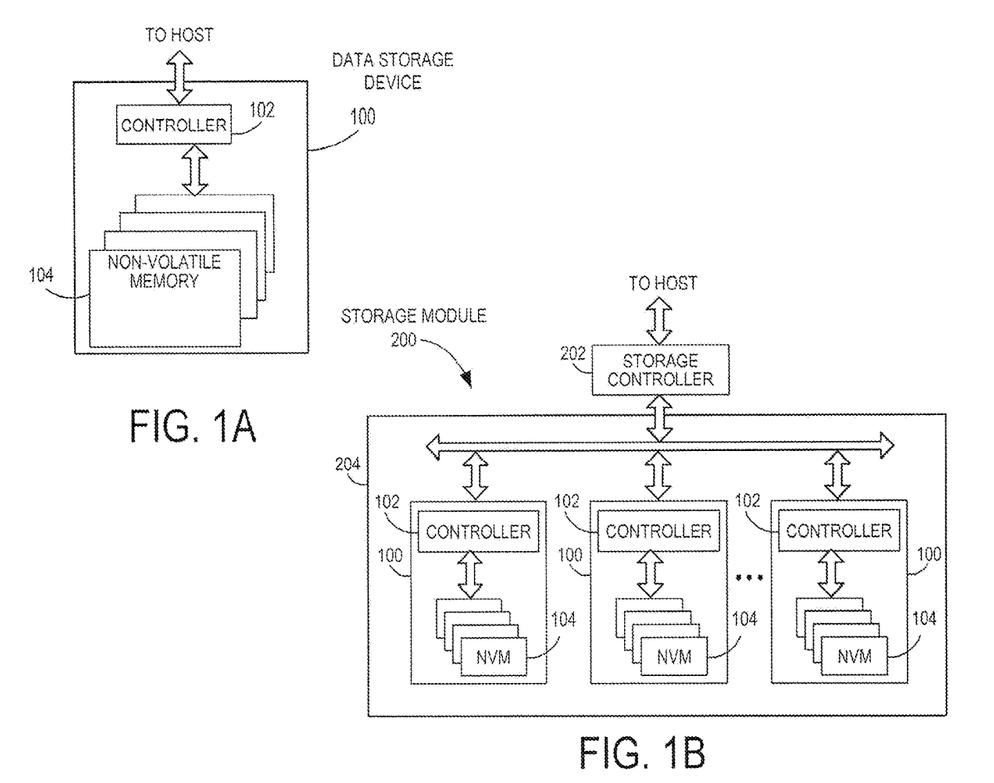
FIG. 1A is a block diagram of a data storage device of an embodiment.
FIG. 1B is a block diagram illustrating a storage module of an embodiment.
Figure 1C:
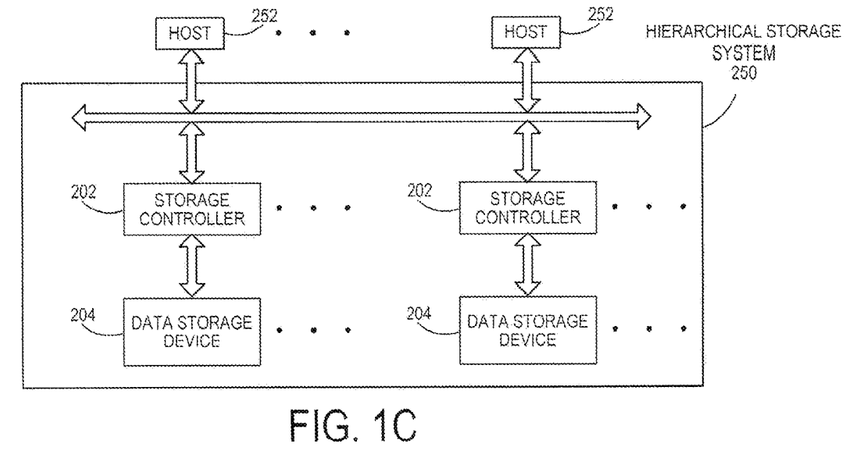
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
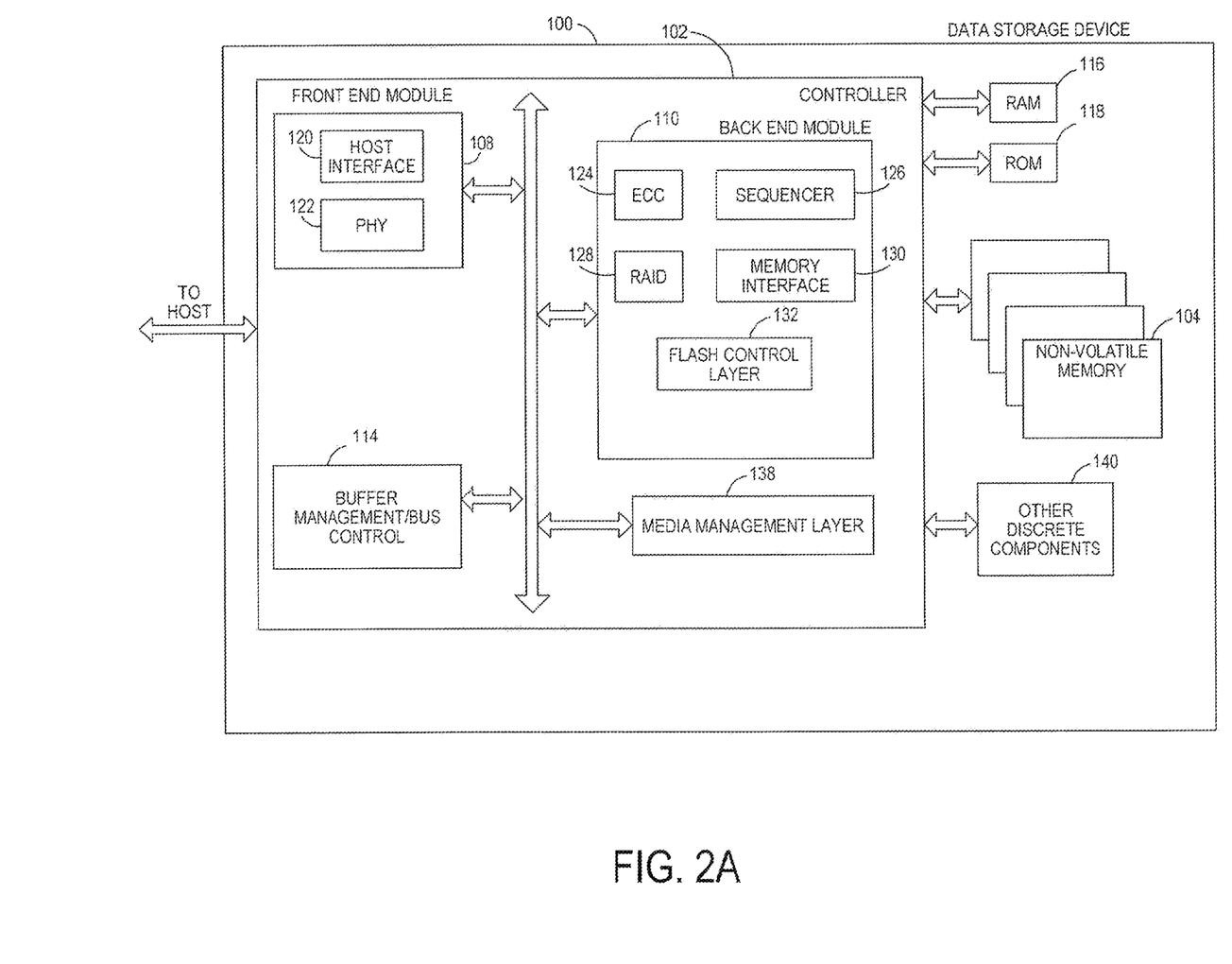
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
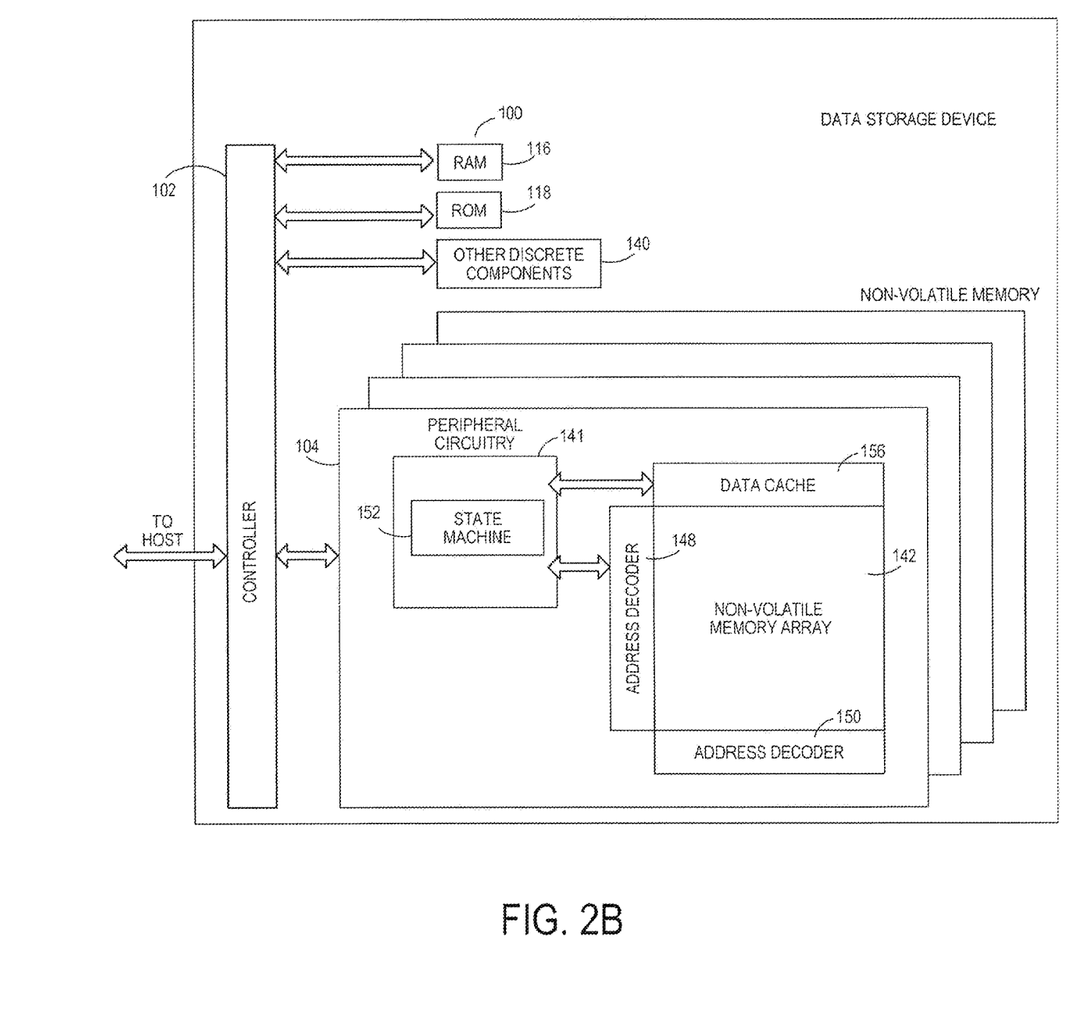
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
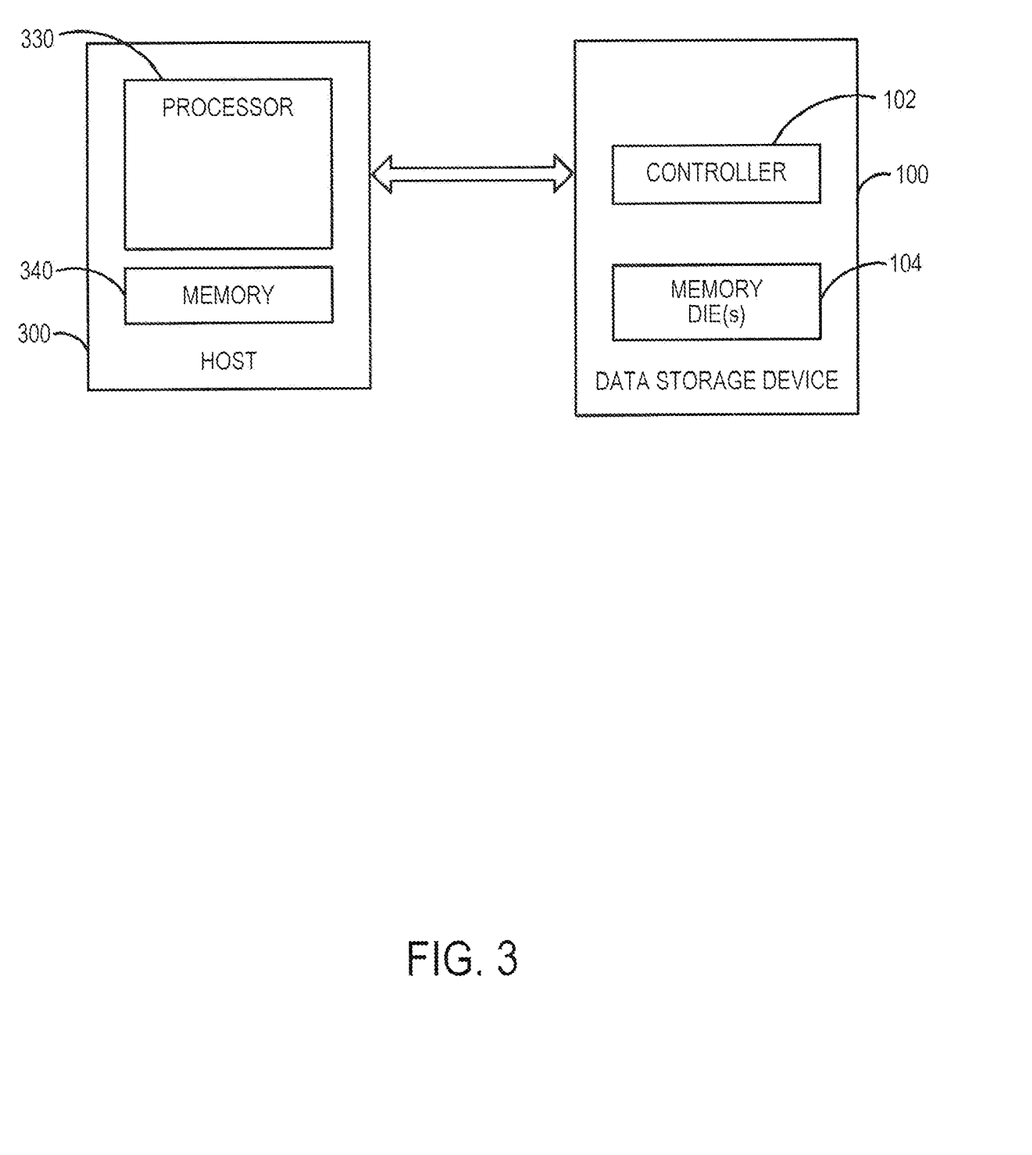
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

In some embodiments, some or all of the memory 340 (e.g., volatile memory) in the host 300 is used by the data storage device 100 as an extension of its memory (e.g., volatile memory). This memory is sometimes referred to herein as the host memory buffer (HMB). The host memory buffer 340 can store any data from the data storage device 100. For example, the data storage device 100 can use the host memory buffer 340 to store a portion of a logical-to-physical address map, which is sometimes referred to herein as a "control page," when the data storage device's RAM 116 is not large enough to store that portion. Other types of data can be stored in the host memory buffer 340.

Figure 4:
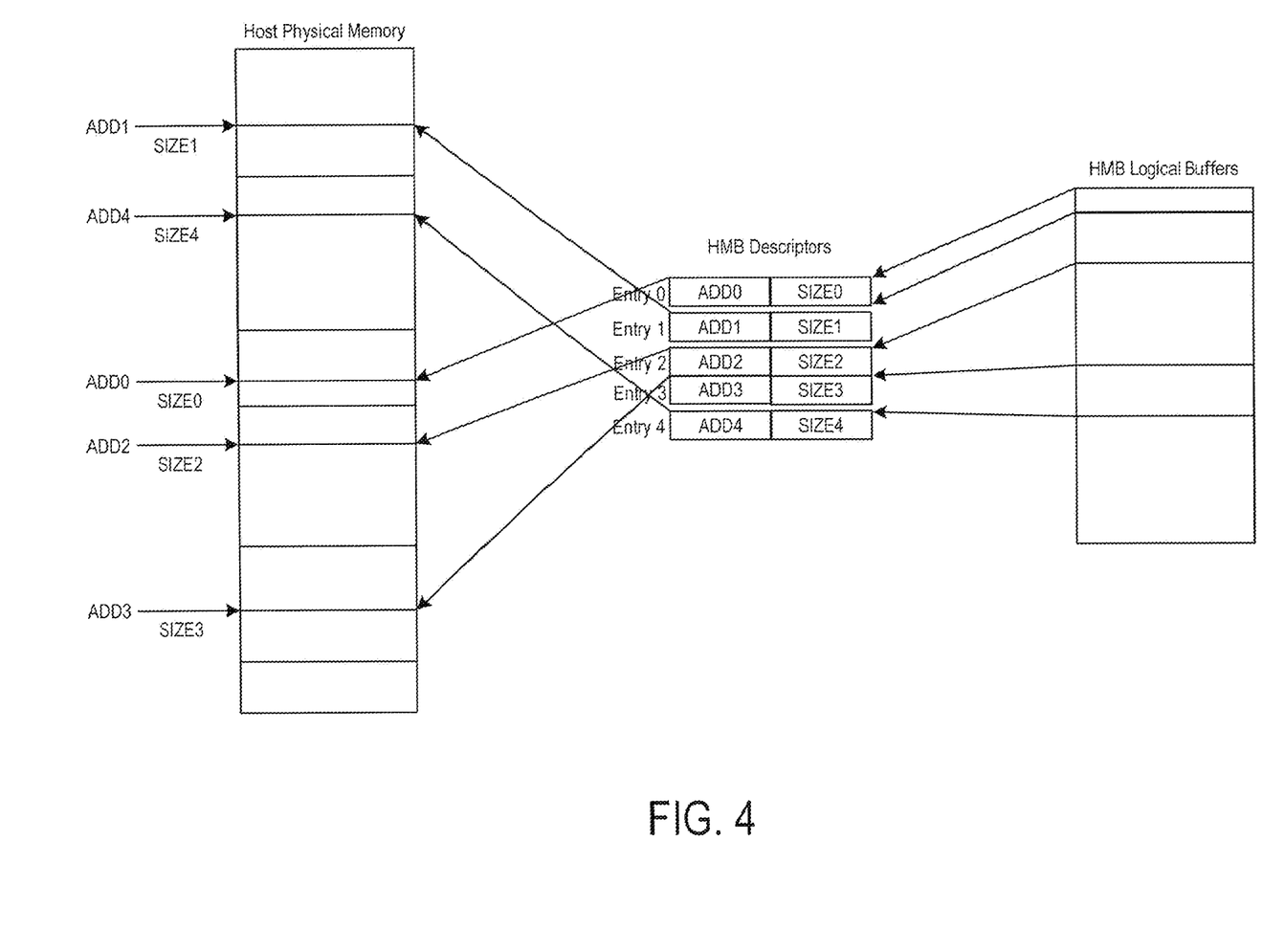
FIG. 4 is a block diagram of a host physical memory, host memory buffer descriptors, and host memory buffer logical buffers of an embodiment.

The physical memory space in the host memory buffer 340 can be very large and can introduce latencies while accessing data stored therein (e.g., control pages). This can be a performance-critical problem when performance requirements are very critical. With an increasing size of the host memory buffer 340, the amount of time taken to flush the entire host memory buffer 340 (i.e., copy all the data stored in the host memory buffer 340 to the data storage device's non-volatile memory 104) can be significantly higher and increase the entry/exit latencies. This can also increase write amplification if flushing is inefficient, such as when the host memory buffer 340 is turned off during low-power states. (A low-power state can be triggered by the host 300 and/or the data storage device 100.) Also, as the size of the host memory buffer 340 increases, the entire host memory buffer 340 may not be turned on during low-power/active-idle states. Further, as shown in FIG. 4, if the host memory buffer 340 space is large, flushing the whole region may take a long time. Also, if the data storage device 100 maintains a copy of all host memory buffer updates, the space utilization of the host memory buffer 340 will not be efficient.

The following embodiments can be used to maximize device space utilization along with minimizing latencies and flushing to the non-volatile memory 104. In one embodiment, the host memory buffer 340 can be used efficiently by either having power islanding in the host memory buffer 340 along with efficient space utilization while keeping the amount of flushes minimal or, in absence of host-memory-buffer power islanding, providing a cached SRAM to minimize entry/exit latencies and flushes. These embodiments can be used with any suitable data storage device, such as a low-power double-data rate (LPDDR) device.

In general, with these embodiments, the host 300 can provide an indication to the data storage device 100 that a specific host memory buffer area will not be available during a low-power state. During a low-power state, power is reduced to the host memory buffer 340, resulting in some of the memory cells not being powered-up to be able to store data. In a deep power state, even more power is reduced. The controller 102 in the data storage device 100 can maintain a dual copy of the data stored in the host memory buffer 340 based on a threshold. Once the threshold has been crossed, the controller 102 in the data storage device 100 can maintain a copy of the data beyond that threshold only in the host memory buffer 340. The data storage device 100 can provide volatile memory buffers in case no area of the host memory buffer 340 is powered on to minimize data flushes back to the non-volatile memory 104. This is in contrast to approaches in which the data storage device 100 maintains a copy of all host memory buffer updates, which is not efficient in terms of flushes and space utilization. This is also in contrast to approaches in which all dirty (invalidated) host memory buffer pages need to be flushed, which can cause high latencies or result in the data storage device 100 not utilizing the host memory buffer 340 in a low-power state.

Figure 5:
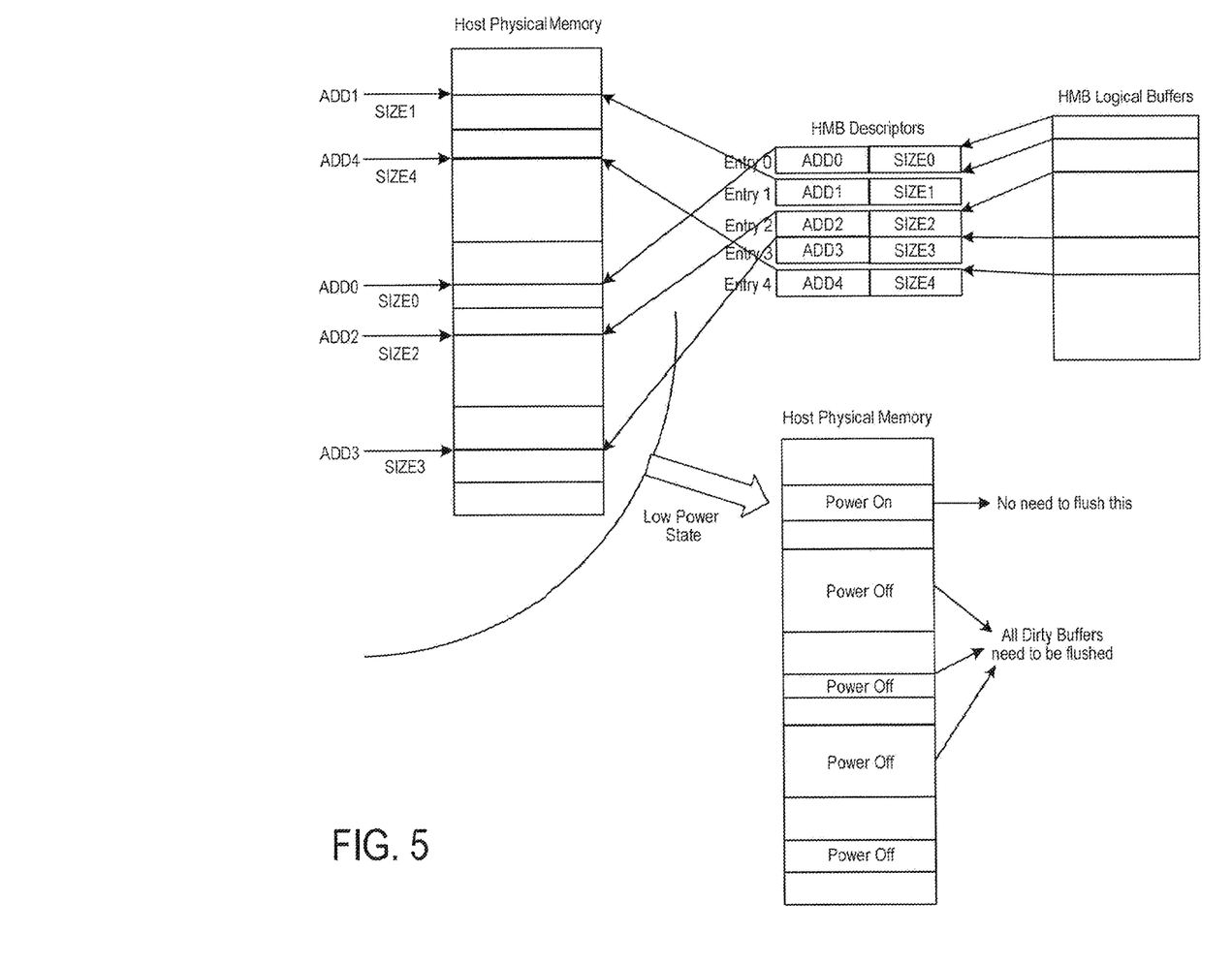
FIG. 5 is an illustration of an embodiment in which a host provides information to a data storage device regarding any specific area in a host memory buffer that will be powered on during a low-power state.

Turning again to the drawings, FIG. 5 illustrates an embodiment in which the host 300 provides information to the data storage device 100 (e.g., using a vendor-specific command) of any specific area in the host memory buffer 340 that will be powered off (or on) during a low-power state. (As will be described in more detail below, the controller 102 in the data storage device 100 can take a different action if no area is powered off/on.) As shown in FIG. 5, in this embodiment, the host 300 communicates to the data storage device 100 if any region (and the size of such region) of the host memory buffer 340 will be powered off (or on) during a low-power state. The data storage device 100 utilizes this information as noted below and, in the absence of any such region, can provide different handling.

Once this information is decided, the controller 102 of the data storage device 100 can determine when a dual copy needs to be maintained and when the data storage device 100 can get rid of any such dual copies, so that only one copy will be available (e.g., in the host memory buffer 340). This can be done based on a threshold. Once that threshold is crossed, only the host memory buffer region is marked dirty. The data storage device 100 can maintain this information in any suitable way (e.g., at 4 kilobyte (KB)/32 KB granularity based on SRAM available and to align with a control page, if required).

Figure 6:
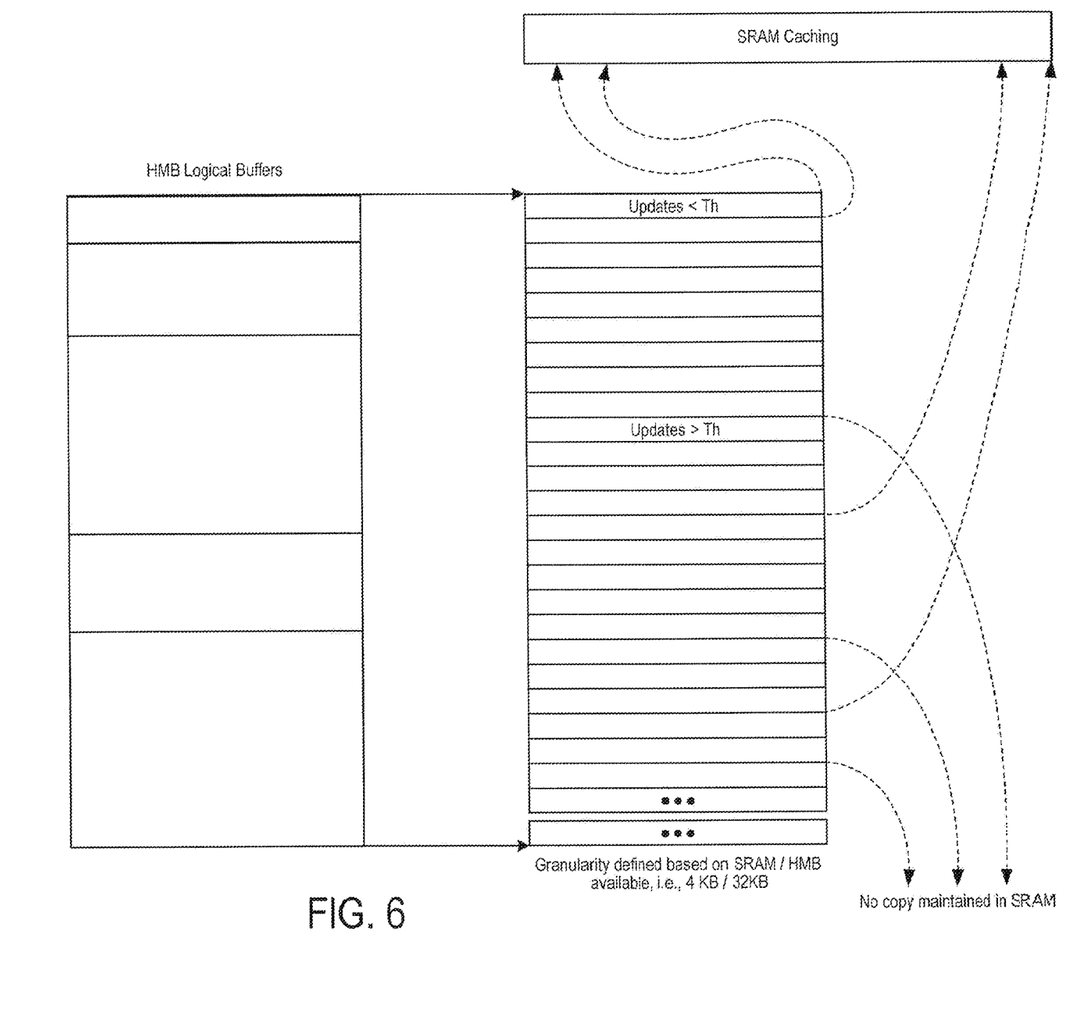
FIG. 6 is an illustration of an embodiment that shows how a data storage device can perform a data flush.

The controller 102 in the data storage device 100 can utilize the information in any suitable way. For example, based on the chunks that are dirty (i.e., which amount of updated data is larger than the threshold), the controller 102 in the data storage device 100 can copy the dirty chunks to a region that will be powered on during a low-power state. The controller 102 can calculate in advance if such regions exceed the mentioned area and can do some flushes in advance (i.e., in the foreground), if required. This is shown in FIG. 6. As illustrated in this diagram, only a specific area of the host memory buffer 340 is turned on, and the SRAM copy remains part of the device control structure, which can be either regenerated or periodically synced. If this region of the host memory buffer 340 also needs to be powered off, only this region needs to be flushed. Immediately upon power-on, the reverse operations can be performed to reach the earlier state of the host memory buffer 340.

Figure 7:
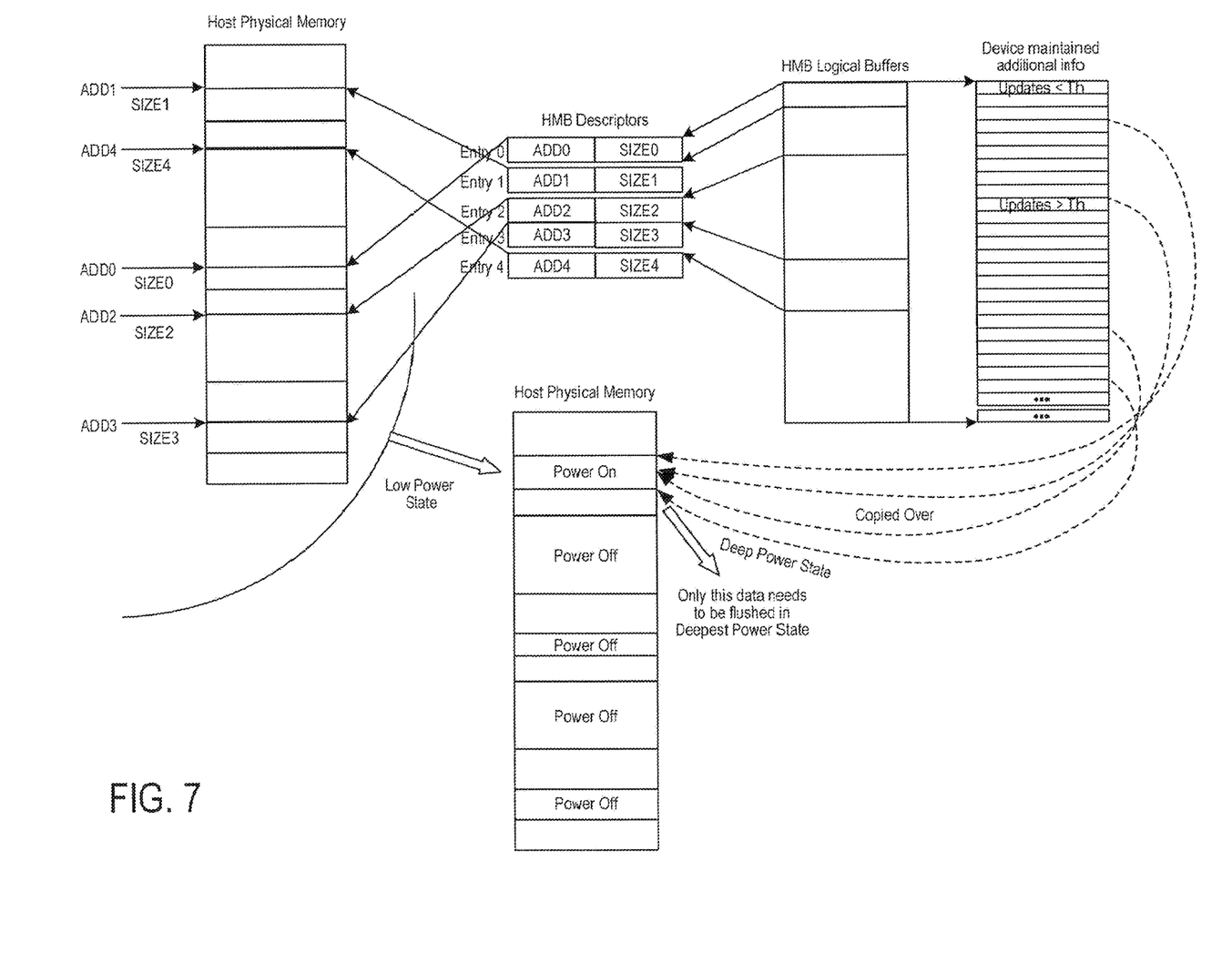
FIG. 7 is an illustration of an embodiment that shows how a data storage device can utilize host-provided information.
Figure 8:
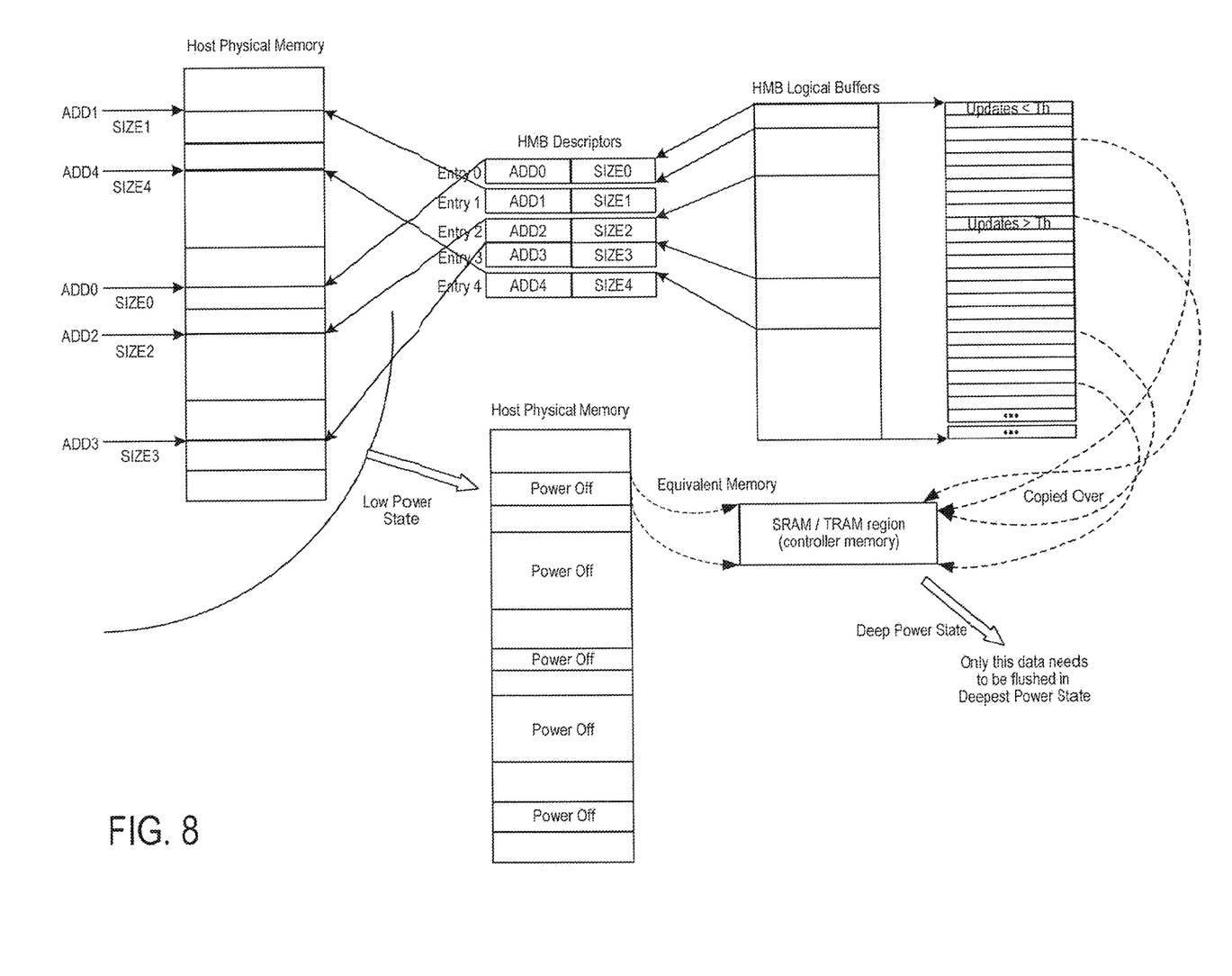
FIG. 8 is an illustration of an embodiment that shows how a data storage device can operate in the absence of a power-on or deep-power state.

In the absence of any host memory buffer region being powered on during a low-power state, the controller 102 of the data storage device 100 can cause the SRAM (or other volatile memory region that is not used during a low-power state) to remain on and copy data directly to that region. Once the data storage device 100 comes out of low-power state, the reverse operations can be performed, and the full host memory buffer state can be created. As shown in FIGS. 7 and 8, in deep-power states when the entire SRAM needs to be turned off, only this region needs to be flushed along with the real mapping. During power on, the full host memory buffer state can be created. It should be noted that, in any of these embodiments, the SRAM or other volatile memory can be located in the controller 102 or outside of the controller 102 in the data storage device 100.

There are many advantages associated with these embodiments. For example, these embodiments allow full efficient utilization of host memory buffer space, as well as a faster entry/exit time during power state transitions. Further, these embodiments can result in fewer flushes to the non-volatile memory, which can result in higher performance and endurance.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
 a volatile memory;
 a non-volatile memory; and a controller configured to:
  store data in a host memory buffer in a host;
  maintain dual copies of updates to the data in both the host memory buffer and the volatile memory in the data storage device until a number of updates exceeds a threshold after which updates are stored in the host memory buffer without storing copies of the updates in the volatile memory in the data storage device;
  receive information from the host that a first area of the host memory buffer will not be powered on during a low-power state;
  identify update(s) stored in the first area of the host memory buffer that do not have copies stored in the volatile memory in the data storage device; and
  prior to the host entering the low-power state, flush the identified update(s) from the first area of the host memory buffer to a second area of the host memory buffer that will be powered on during the low-power state.

2. The data storage device of claim 1, wherein the controller is further configured to copy the identified update(s) back to the first area of the host memory buffer after the host exiting the low-power state.

3. The data storage device of claim 1, wherein the controller is further configured to:
  in response to the information indicating that no area of the host memory buffer will be powered on during the low-power state, flush data from the first area of the host memory buffer to the volatile memory.

4. The data storage device of claim 3, wherein the controller is further configured to copy the data from the volatile memory back to the first area of the host memory buffer after the host exiting the low-power state.

5. The data storage device of claim 1, wherein:
  only updates that do not have a copy maintained in the volatile memory are flushed to the second area of the host memory buffer.

6. The data storage device of claim 1, wherein the volatile memory is in the controller.

7. The data storage device of claim 1, wherein the information is received from the host via a vendor-specific command.

8. The data storage device of claim 1, wherein the data storage device is a low-power double-data rate (LPDDR) data storage device.

9. The data storage device of claim 1, wherein the non-volatile memory comprises a three-dimensional memory.

10. The data storage device of claim 1, wherein the controller is further configured to flush the identified update(s) in a foreground operation.

11. The data storage device of claim 1, wherein the volatile memory is external to the controller.

12. The data storage device of claim 1, wherein the volatile memory comprises static random access memory (SRAM).

13. A method comprising:
performing the following in a host in communication with a data storage device, wherein the host comprises a host memory buffer:
  storing data received from the data storage in the host memory buffer;
  storing updates to the data in the host memory buffer, wherein some but not all of the updates are also stored in the data storage device;
  informing the data storage device that a first location in the host memory buffer will not be powered on during a low-power state; and
  receiving a command from the data storage device to, prior to entering the low-power state, flush a subset of the updates from the first location in the host memory buffer to a second location in the host memory buffer that will be powered on during the low-power mode, wherein the subset of updates is not stored in the data storage device.

14. The method of claim 13, further comprising receiving a command from the data storage device to copy the subset of the updates from the second location in the host memory buffer back to the first location in the host memory buffer after exiting the low-power state.

15. The method of claim 13, wherein informing is done using a vendor-specific command.

16. The method of claim 13, wherein the data storage device is a low-power double-data rate (LPDDR) data storage device.

17. The method of claim 13, further comprising informing the data storage device that the host is entering a low power state.

18. The method of claim 13, further comprising flushing the identified update(s).

19. The method of claim 18, Wherein the identified update(s) are flushed in a foreground operation.

20. A data storage device comprising:
a volatile memory;
a non-volatile memory;
means for storing data in a host memory buffer in a host:
means for maintaining dual copies of updates to the data in both the host memory buffer and the volatile memory in the data storage device until a number of updates exceeds a threshold after which updates are stored in the host memory buffer without storing copies of the updates in the volatile memory in the data storage device;
means for receiving information from the host that a first area of the host memory buffer will not be powered on during a low-power state;
means for identifying update(s) stored in the first area of the host memory buffer that do not have copies stored in the volatile memory in the data storage device; and
means for flushing the identified update(s) from the first area of the host memory buffer to a second area of the host memory buffer that will be powered on during the low-power state.

* * * * *